(12) United States Patent
Kiyko

(10) Patent No.: US 8,455,079 B2
(45) Date of Patent: Jun. 4, 2013

(54) MULTI-LAYER OPTICAL DISC

(75) Inventor: Vadim Veniaminovich Kiyko, Moskovskaya obl. (RU)

(73) Assignee: Everhost Investments Limited, Nicosia (CY)

( * ) Notice: Subject to any disclaimer, the term of this patent is extended or adjusted under 35 U.S.C. 154(b) by 0 days.

(21) Appl. No.: 13/427,560

(22) Filed: Mar. 22, 2012

(65) Prior Publication Data

US 2012/0183717 A1    Jul. 19, 2012

Related U.S. Application Data

(63) Continuation of application No. PCT/RU2010/000510, filed on Sep. 9, 2010.

(30) Foreign Application Priority Data

Sep. 28, 2009  (RU) .................................. 2009136392

(51) Int. Cl.
*G11B 7/24*    (2006.01)

(52) U.S. Cl.
USPC ................. 428/64.1; 428/64.4; 430/270.11; 369/288

(58) Field of Classification Search
CPC .............................................. G11B 2007/257
USPC .................................... 428/64.4; 430/270.11
See application file for complete search history.

(56) References Cited

U.S. PATENT DOCUMENTS

| | | |
|---|---|---|
| 6,045,888 A | 4/2000 | Chen et al. |
| 7,449,278 B2 | 11/2008 | Tawa |
| 2008/0030532 A1 | 2/2008 | Onoe |

FOREIGN PATENT DOCUMENTS

| | | |
|---|---|---|
| WO | 2005008637 A2 | 1/2005 |
| WO | 2006136118 A2 | 12/2006 |

OTHER PUBLICATIONS

International Search Report from International Application PCT/RU2010/000510, filed Sep. 9, 2010, mailed Jan. 20, 2011.

*Primary Examiner* — Elizabeth Mulvaney
(74) *Attorney, Agent, or Firm* — Patentbar International P.C.

(57) ABSTRACT

The invention relates to three-dimensional optical memory devices and can be used in all areas of computing in which it is necessary to record large data files on compact carriers. The claimed device can also be used for recording, storing and playing back video and audio recordings. A multi-layer optical disc consists of a series of alternating layers of optically transparent materials arranged in groups that comprise a layer of a material with a refraction index n1 enclosed between a layer of a material with a refraction index n2, which satisfies the relationship n2<n1, and a layer of a material with a refraction index n3, which satisfies the relationship |n3−n1|<0.001, wherein the layer with the refraction index n3 contains a photosensitive compound that can exist in two forms characterized by different optical properties.

4 Claims, 2 Drawing Sheets

MULTI-LAYER OPTICAL DISC

RELATED APPLICATIONS

This Application is a Continuation application of International Application PCT/RU2010/000510 filed on Sep. 9, 2010, which in turn claims priority to Russian application No. RU2009136392 filed on Sep. 28, 2009, both of which are incorporated herein by reference in their entirety.

FIELD OF THE INVENTION

The invention is related to three-dimensional optical memory devices and it may be used in all computer fields where there is required to record large information files on compact carriers.

BACKGROUND OF THE INVENTION

When creating multilayer optical disks with a large number of information layers, one of the main problems is addressing the information layer during a readout procedure. In prior-art one-layer and two-layer optical disks, the reading radiation is furnished to the information layer via flat surface of the disk. However, if the number of layers increases, there occur big problems with determination of the number of information layer from which the signal with recorded data is received. This problem is solved by directing the reading radiation to a special ducting layer located near the disk addressable information layer via its lateral surface (cylindrical surface).

Previously known is a multilayer optical disk (USA patent application No.2008/0305324 A1 published Nov. 12, 2008, B32B 17/10) including several information layers separated from one another by at least two insulating layers made of polymers with different mechanical properties. One of the insulating layers possesses an increased rigidity at the expense of a filler introduced into it, and its thickness is from 5 to 15 μm, and the other possesses an increased elasticity and has a thickness of 10 to 50 μm. The said structure ensures excellent mechanical properties of a multilayer optical disk, namely: deformational stability. However, this disk is not intended for use in readout devices having high addressing accuracy, since its structure does not assume availability of a waveguide layer and does not envisage a possibility of introducing the reading radiation via its lateral surface.

Previously known is a multilayer optical disk (U.S. Pat. No. 7,449,278 B2, published Nov. 11, 2008, G1 1B 7/24) including groups of layers spaced in series where each group consists of three layers: the information layer where under the effect of radiation with a wavelength $\lambda 1$ there occur photochemical processes resulting in variation of optical properties of the material the information layer is composed of; the photochromic layer which the reflecting capability is increased under the effect of radiation with a wavelength $\lambda 2$ and the waveguide layer intended for propagation therein of radiation with a wavelength $\lambda 2$ and introduced into a multilayer disk via its lateral surface. The data addressing reliability in this disk is higher than that of aforesaid analog since in the readout mode, the reflecting photochromic layer isolates the data receiver from the signals coming to it from underlying information layers, but the signals coming from the overlying non-addressable information layers can still reach the receiver thus reducing the data readout reliability.

A multilayer optical disk (U.S. Pat. No. 6,045,888, published Apr. 4, 2000, B32B 3/00) is the closest one to the claimed invention by its technical essence, it consists of a series of alternating layers of optically transparent materials combined into groups incorporating a layer of glass of 140 μm in thickness with a refraction index $n1=1.515$ enclosed between a polymer with a refraction index $n2$ satisfying the relationship $n2<n1$ and a layer of photochromic material with a refraction index $n3=1.47$, which can change its optical properties under the effect of radiation with a wavelength $\lambda 1$ and acquire a property of fluorescenting under the effect of radiation with a wavelength $\lambda 2$ at a wavelength $\lambda 3$. During the information readout, the radiation with a wavelength $\lambda 2$ is directed to this multilayer optical disk via its lateral surface, i.e., to the glass surface. During waveguide propagation of light in a glass, an insignificant portion of radiation power, only, penetrates the photochromic material information layer in the form of evanescent mode. Therefore, the value of the signals, arriving at the radiation receiver at a wavelength $\lambda 3$ from those sections (pixels) of the glass-adjoining information layer, which were previously illuminated by radiation with a wavelength $\lambda 1$ and which contain the information bits, is very small. In order to increase the signal-to-noise ratio and obtain a reliable registration of radiation at a wavelength $\lambda 3$, the lateral dimensions of pixels in the photochromic layer plane should be increased, and this results in a decrease of information capacity of the multilayer optical disk.

SUMMARY OF THE INVENTION

Technical result the attainment of which the claimed invention is striving for consists in increasing the information capacity of the multilayer optical disk with a simultaneous increase of the recorded information readout reliability.

The said technical result is obtained by the fact that in the multilayer optical disk including a series of alternating layers of optically transparent materials combined into groups incorporating a waveguide layer of material with a refraction index of $n1$ lying between the insulating layer of material with a refraction index $n2$ satisfying the relationship $n2<n1$ and an information layer of photochromic material with a refraction index $n3$, the refraction indices of materials of the waveguide and information layers satisfy the condition $|n3-n1|<0.001$.

Besides, the thickness of information layer d satisfies the condition $1 \mu m < d < 10 \mu m$.

Besides, the thickness of waveguide layer D satisfies the condition $5 \mu m < D < 100 \mu m$.

Besides, the thickness of insulating layer $\delta$ satisfies the condition $1 \mu m < \delta < 5 \mu m$.

The essence of invention consists in the following. The value of radiation signal at a wavelength $\lambda 3$ is proportional to the product of readout radiation at a wavelength $\lambda 2$ by the pixel volume. If the absolute value of difference of the refraction indices of material of waveguide layer and its adjoining information layer in the multilayer optical disk does not exceed the claimed value of 0.001, then the waveguide mode of the reading radiation with a wavelength $\lambda 2$ does not propagate in these two layers without deformation and loss as in the single waveguide layer. The intensity of waveguide mode is in large excess over the intensity of evanescent mode and, consequently, the fluorescent radiation signal value at a wavelength $\lambda 3$ will be considerably higher even if the pixel volume is decreased by several times at the expense of decreasing its area in the information layer plane. In other words, the claimed invention is expected to provide a simultaneous increase of the recording density and reliability of the recorded information readout. It should be noted that the information layer thickness shall not be chosen too large. The matter is that the photochromic material refraction indices in the initial state and in the state changed under the effect of radiation with a wavelength $\lambda 1$ are slightly different. In this connection, as a result of recording the data, a light dissipation in the information layer increases. This may result in deformation and attenuation of the waveguide mode of reading radiation. The claimed absolute difference value of refraction indices of materials of waveguide layer and its adjoining information layers equal to 0.001 is rather significant. Exceedance of this value will result in the fact that the waveguide mode will propagate in the layer the material refraction index of which is higher: either in the waveguide layer (in this case, the claimed invention will be identical to the prototype) or in the information layer (in this case, optical heterogeneities of the photochromic material will cause dissipation and degradation of the reading radiation).

BRIEF DESCRIPTION OF THE DRAWINGS

The essence of invention is explained by the drawings where shown in FIG. 1 is the general view of multilayer optical disk 1 with focusing system 2 and information readout device 3; shown in FIG. 2 are typical absorption spectra of photochromic material in the initial state (solid line) and changed state (dashed line) under the effect of radiation with a wavelength $\lambda 1$, and also the fluorescence spectrum (dotted line) under the effect of radiation with a wavelength $\lambda 2$; presented in FIG. 3 is multilayer optical disk plex 1 in section with waveguide layers 4, insulating layers 5, information layers 6 and pixel 7 of information layer 6 interacting with the radiation waveguide mode having a wavelength $\lambda 2$.

In the example of the invention best realization, waveguide layer 4 with a thickness of 50 μm is made of polycarbonate with a refraction index n1=1.5, insulating layer 5 of 2 μm in thickness is made of polymethyl acrylate doped with spirobenzopyran having a refraction index n1=1.5. The said photochromic material has two stable forms: spiropyran and merocyanine. Transition from the first form to the second form is carried out under the effect of ultraviolet radiation.

DETAILED DESCRIPTION OF THE PREFERRED EMBODIMENTS

Realization of Invention

Figure 1:
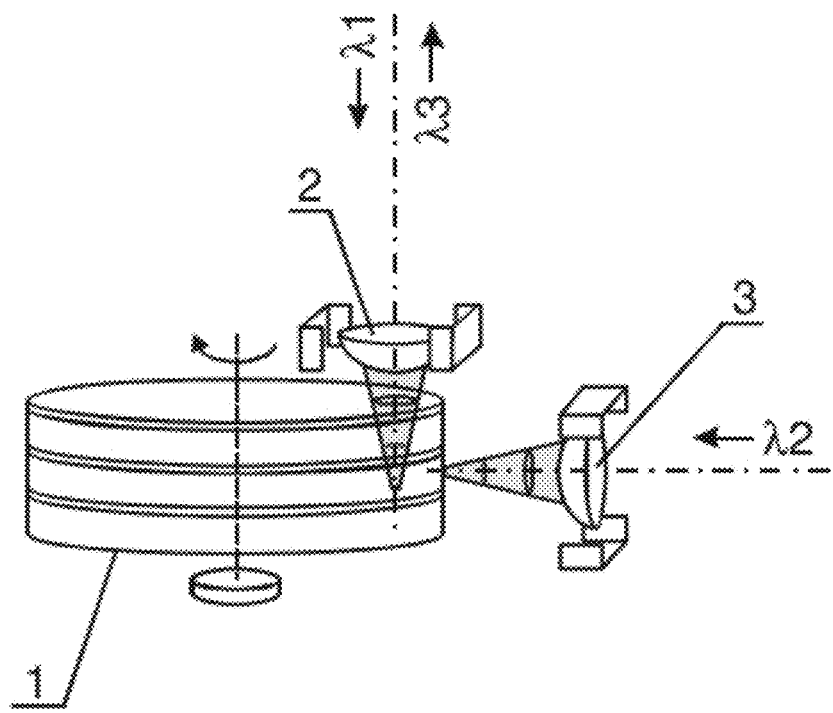
Figure 2:
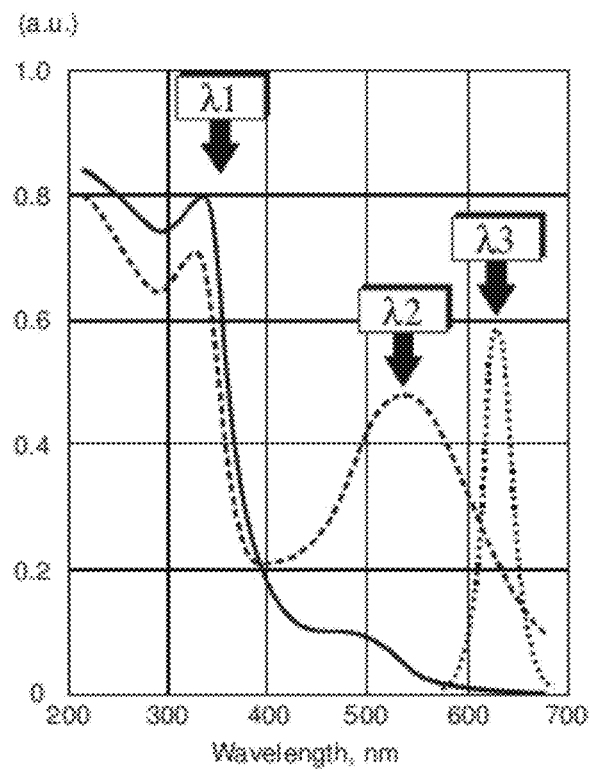
Figure 3:
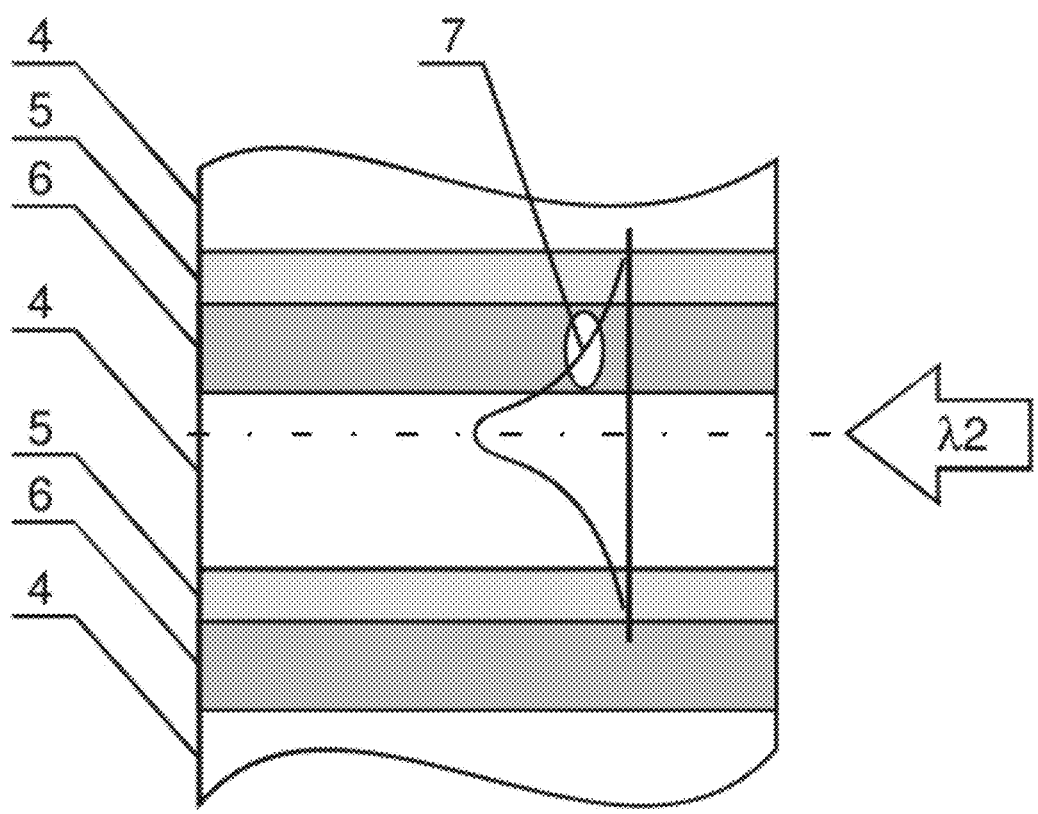

Claimed multilayer optical disk 1 operates as follows. In the recording mode, the radiation is directed at a wavelength $\lambda 1$ to focusing system 2 thus providing for positioning of the light beam focusing fields at a wave length $\lambda 1$ inside multilayer optical disk 1. Recording of information is carried out by changing the optical properties of photochromic material in information layer 6 selected for recording. In the readout mode, information readout device 3 directs the radiation at a wavelength $\lambda 2$ to waveguide layer 4 adjoining addressable information layer 6. The waveguide mode limited by insulating layers 5 adjacent on one side to addressable information layer 6 and on the other side, to waveguide layer 4, propagates over specified waveguide layer 4 and information layer 6, and interacts with the pixels containing the recorded information. The data readout is performed by registering the fluorescent radiation at a wavelength $\lambda 3$ excited by radiation with a wavelength $\lambda 2$ in those pixels of the information layer, which were previously illuminated by the radiation with a wavelength $\lambda 1$. The fluorescent radiation emitted by these pixels partially gets into the aperture of focusing system 2 and then, it arrives at the receiver input.

The inventor failed to disclose multilayer optical disks containing the adjoining waveguide and information layers with equalised refraction indices among the solutions known in the scientific and technical publications, which is indicative of the fact that the invention corresponds to the novelty criterium. Within the framework of this approach, there is substantiated a sufficiency of essential features for attainment of the claimed technical result.

When estimating the importance of invention for industrial use, it is necessary to point out that production of the claimed multilayer optical disk does not require application of precise technologies as distinct from the analogs.

What is claimed is:

1. A multilayer optical disk consisting of a series of alternating layers of optically transparent materials combined into groups incorporating a waveguide layer of material with a refraction index of n1 lying between the insulating layer of material with a refraction index n2 satisfying the relationship n2<n1 and an information layer of photochromic material with a refraction index n3, the refraction indices of materials of the waveguide and information layers satisfy the condition $|n3-n1|<0.001$.

2. The multilayer optical disk according to claim 1, characterized by that the thickness of information layer d satisfies the condition 1 μm<d<10 μm.

3. The multilayer optical disk according to claim 1, characterized by that the thickness of waveguide layer D satisfies the condition 5 μm<D<100 μm.

4. The multilayer optical disk according to claim 1, characterized by that the thickness of insulating layer δ satisfies the condition 1 μm<δ<5 μm.

* * * * *